(12) United States Patent
Hoshino

(10) Patent No.: US 6,312,184 B1
(45) Date of Patent: Nov. 6, 2001

(54) PIPE CONNECTOR

(75) Inventor: Yoshihiro Hoshino, Nagoya (JP)

(73) Assignee: Hoshino Gakki Kabushiki Kaisha (JP)

( * ) Notice: Subject to any disclaimer, the term of this patent is extended or adjusted under 35 U.S.C. 154(b) by 0 days.

(21) Appl. No.: 09/543,521

(22) Filed: Apr. 6, 2000

(30) Foreign Application Priority Data

Dec. 2, 1999 (JP) .................................................. 11-343635

(51) Int. Cl.$^7$ ...................................................... F16B 7/10
(52) U.S. Cl. ........................ 403/104; 403/373; 403/344; 403/377
(58) Field of Search ................................... 403/104, 344, 403/373, 377, 379.4, 374.2, 290, 289

(56) References Cited

U.S. PATENT DOCUMENTS 4,111,575  9/1978  Hoshino .
4,497,092  2/1985  Hoshino .

*Primary Examiner*—Lynne H. Browne
*Assistant Examiner*—John R. Cottingham
(74) *Attorney, Agent, or Firm*—Ostrolenk, Faber, Gerb & Soffen, LLP

(57) ABSTRACT

To connect a large and a small diameter pipe, a pipe connector has a tightening bush with a cut through it and is compressed around the pipe and has a main body with a receptacle for the tightening bush. The tightening bush has first axial ribs on a circumferential region of the periphery. The main body receptacle has cooperating complementary second internal ribs engaged by the first ribs so that as the bush is tightened, it does not rotate in the receptacle. A large pipe holder extends down from the receptacle for the bush and receives the large diameter pipe. An auxiliary bush may be disposed inside the large pipe in the radial space between the large and small diameter pipes.

3 Claims, 6 Drawing Sheets

PIPE CONNECTOR

BACKGROUND OF THE INVENTION

This invention relates to a pipe connector for connecting a large diameter pipe with a small diameter pipe.

DESCRIPTION OF A PRIOR ART EMBODIMENT

A known cymbal stand 80, shown in FIG. 6 for example, includes a pipe holder 90 that holds a smaller diameter pipe 84 in a larger diameter pipe 83 or a smaller diameter pipe 83 in a larger diameter pipe 82, for connecting and holding them in a freely telescopable, expandable and contractable manner.

The pipe connector 90 in FIG. 7 comprises a split ring tightening bush 91, a main holding tool and receptacle 96, and a tightening member 100, for tightening the arms of the bush over an installed pipe.

The split ring tightening bush 91 is an approximately C-shaped tubular body cut through one side at 92. The cut 92 is defined by edges 93 and 94. A small diameter pipe 83 is inserted into and held in the bush 91.

The main holding body 96 has a tubular, large diameter pipe receiver 97 on one axial side that encases and holds the outer periphery of the end of the large diameter pipe and has a tubular, tightening bush accommodating part 98 for receiving the tightening bush 91 on the other axial side. The small diameter pipe 83 is inserted into and held in the tightening bush 91 as the pipe extends through the bush 91 and the tightening bush accommodating part 98. A screw threaded opening in the part 99 receives a tightening screw 100 for the bush 91.

The screw thread 101 of the tightening member 100 is screwed into the opening 99 of the main holding body 96 and is oriented to compress the cut edge 93 of the tightening bush 91 toward the other edge part 94, thereby reducing the width of the cut 92 and compressively holding the small diameter pipe 83 in the bush 91.

A nut 102 positioned inside the bush 91 serves as a holding plate which is contacted by the tip of the tightening member 100. Its purpose is to increase the area of compression at the cut edge part 93 of the tightening bush 91. A spring pin 103 for the opening 103A through the bush 91 prevents slipping of the tightening bush 91.

The outer periphery at the end of the large diameter pipe 82 is inserted into the sleeve 97 below the main holding body 96. The tightening bush 91 receives the small diameter pipe 83. The bush 91 is accommodated in the tightening bush accommodating part 98 of the main holding body 96, so that one end of the small diameter pipe 83 passes through the bush 91 and is inserted into the large diameter pipe 82. The tightening member 100 is thereafter tightened from outside of the main holding body 96 to compress the cut edge 93 of the tightening bush 91 toward the cut edge 94, thereby tightening the bush on the small diameter pipe 83.

Because the head of the screw 101 of the tightening member 100 projects out of the main pipe holding body 96, the tightening member 100 may be bent or damaged if it hits any other object or if the stand falls by mistake during movement of this stand. This would make it impossible to completely tighten the member 100. Moreover, it is disadvantageous from an appearance viewpoint if the screw part 101 of the tightening member 100 is exposed from the main holding body 96.

SUMMARY OF THE INVENTION

This invention provides a pipe connector which will afford both strength and durability to the connector using a simple structure, capable of connecting the small diameter pipe and the large diameter pipe, and which has a desirable outside appearance. The connector comprises a tightening bush having a relatively smaller cross-section pipe holding hole extending axially through the bush. There is a raised ribbed portion having a plurality of rotation prevention ribs extending in the tubular or axial direction and located on the outer peripheral surface of the bush at one circumferential region of the small diameter pipe holding hole. A cut through the bush extends into the small diameter pipe holding hole from the opposite side of the bush from the ribs. The edges of the cut in the bush have bolt through holes which face each other on both sides of the cut.

A main holding body has a large diameter bolder at one axial side of the body that is shaped to encase and hold the outer circumference of the large diameter pipe. It has a tightening bush accommodating receptacle that accommodates the tightening bush on the other axial side from the large diameter pipe holder. An axially extending, complementary ribbed or geared surface located inside the inner circumferential surface of the tightening bush accommodating receptacle engages the ribbed surface outside the tightening bush. A bolt seat and a bolt through part are provided in the main holding body at positions corresponding to the bolt through holes of the tightening bush. A tightening bolt extends through the bolt through holes of the tightening bush and also through the bolt through part and the bolt seat of the main holding body. A tightening nut outside the main holding body is tightened on the bolt, which compresses the edges of the cut through the tightening bush. This tightens the bush on the small diameter pipe held in the small diameter pipe holding part. It also moves the ribbed portion of the outer periphery of the small diameter pipe holding part of the tightening bush circumferentially which presses that periphery against the raised gear surface in the receptacle of the main holding body.

An auxiliary bush may be inserted into the larger diameter pipe at the main holding body, and the smaller diameter pipe is inserted into the auxiliary bush at the adjacent end of the larger diameter pipe.

Other objects and features of the invention are explained below with reference to the attached drawings.

DESCRIPTION OF A PREFERRED EMBODIMENT

Figure 1:
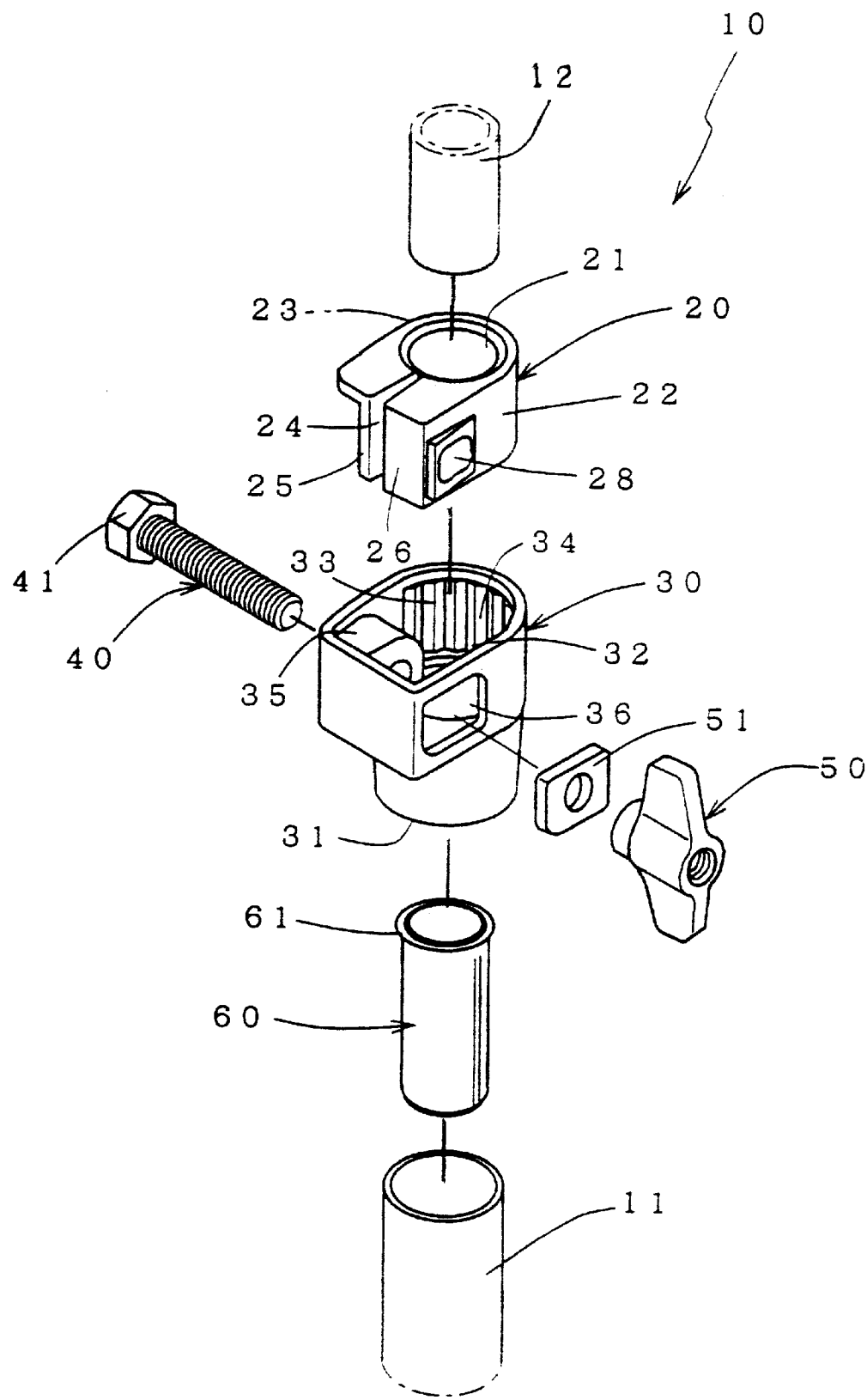
FIG. 1 is an oblique exploded view of a pipe connector of the invention.
Figure 2:
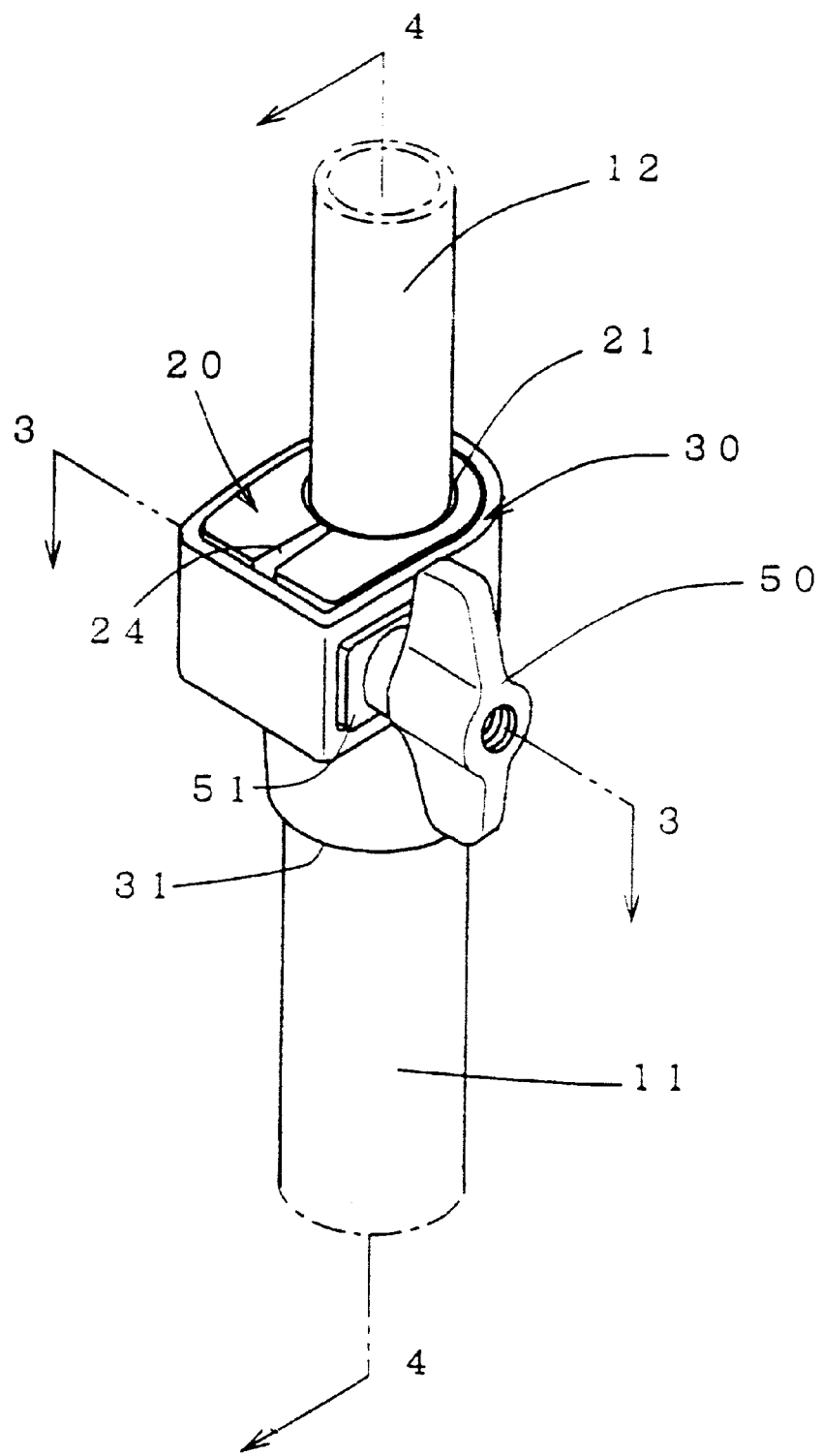
FIG. 2 is an oblique view of the assembled state.
Figure 6:
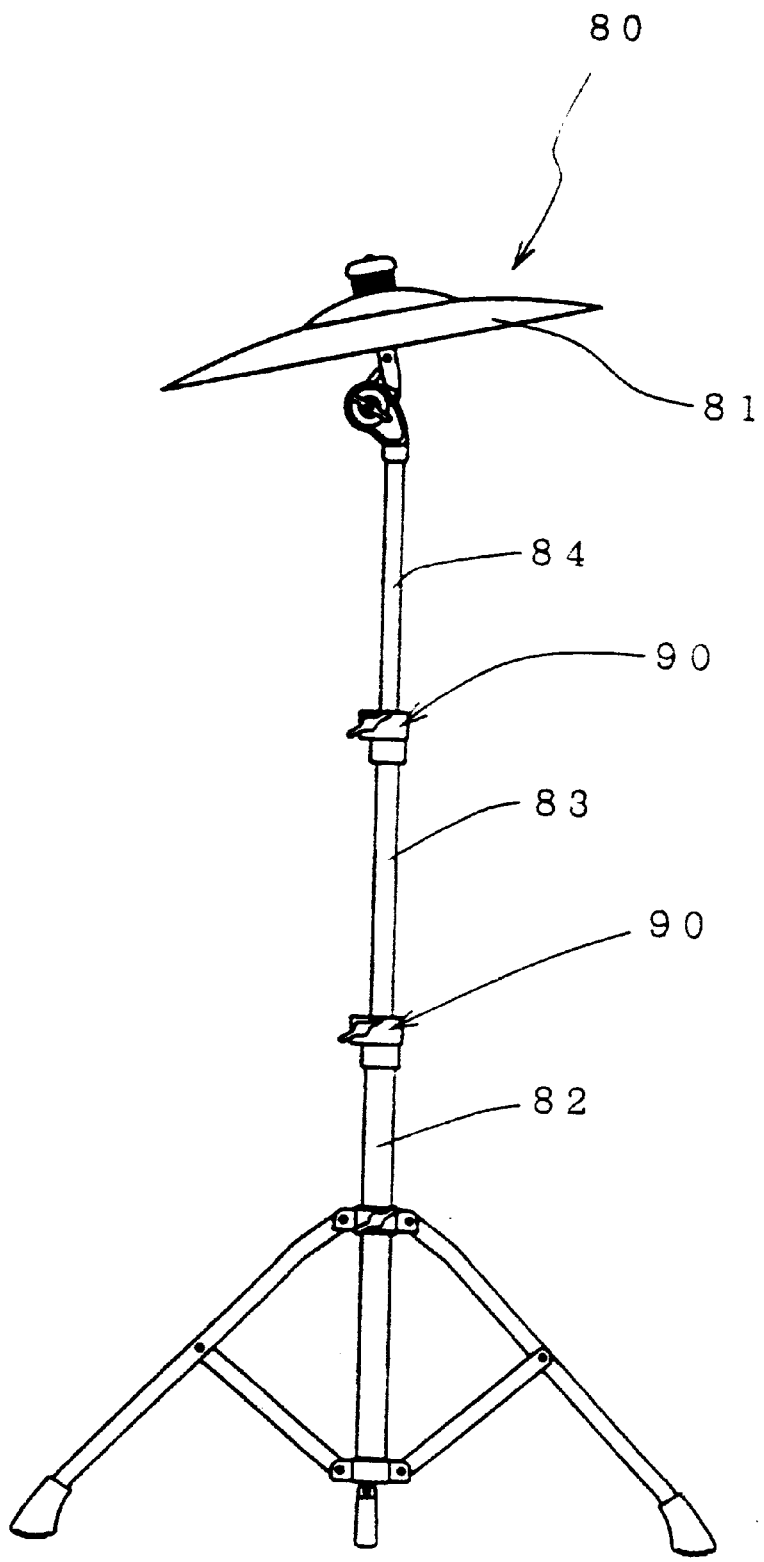
FIG. 6 shows a cymbal stand of a type which generally uses the invention.
Figure 7:
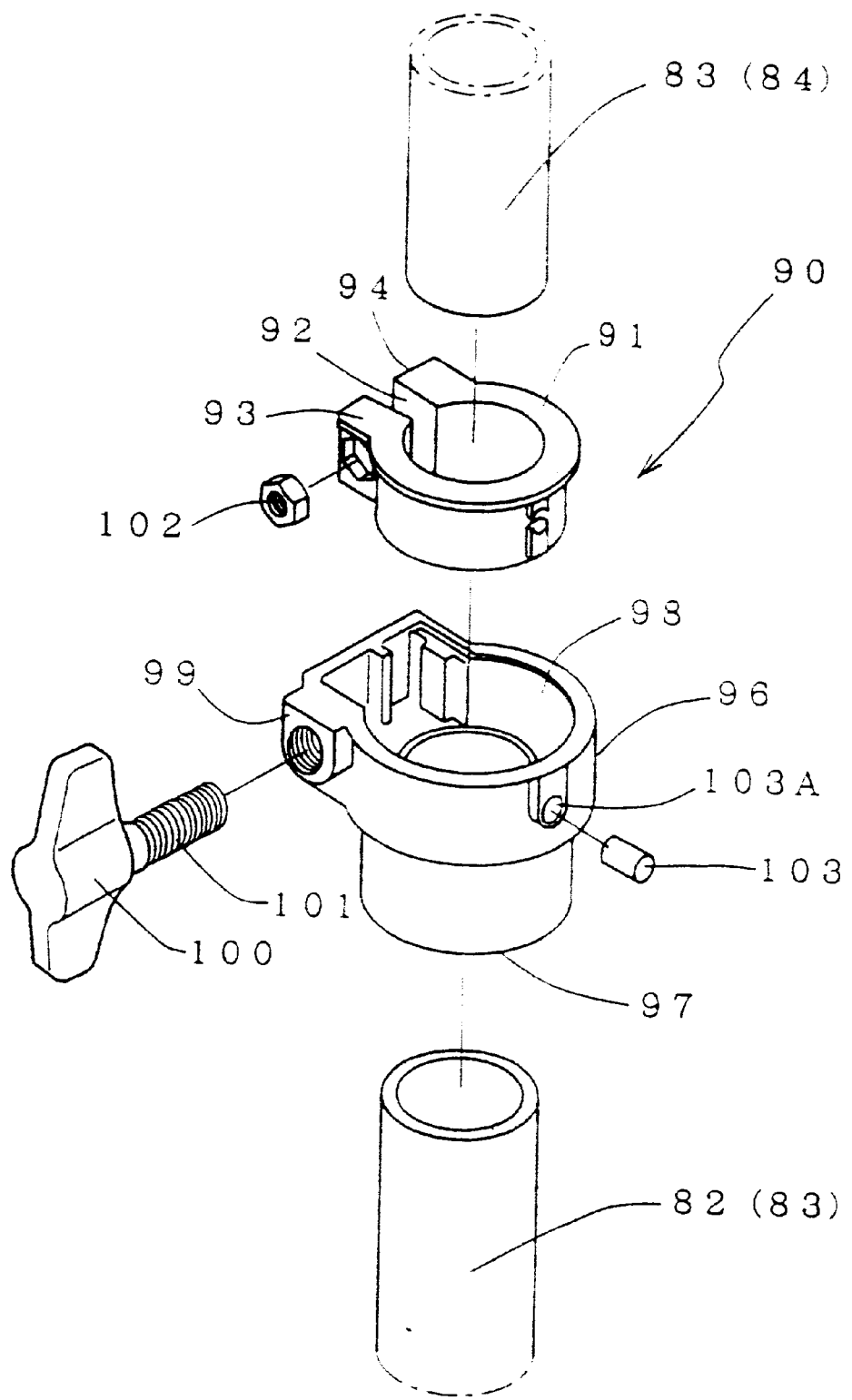
FIG. 7 is an oblique view of a pipe connector according to prior art.

The pipe connector 10 according to the invention is for connecting a large diameter pipe 11 and a small diameter pipe 12, as shown in FIGS. 1 and 2. The connector comprises a tightening bush 20 for securing the small diameter pipe 12, a main holding body 30 which receives the bush 20 from above and receives the large diameter pipe 11 from below, a tightening bolt 40 and a cooperating tightening nut 50. As an example, the holding device is used in a cymbal stand as shown in FIG. 6.

Figure 3:
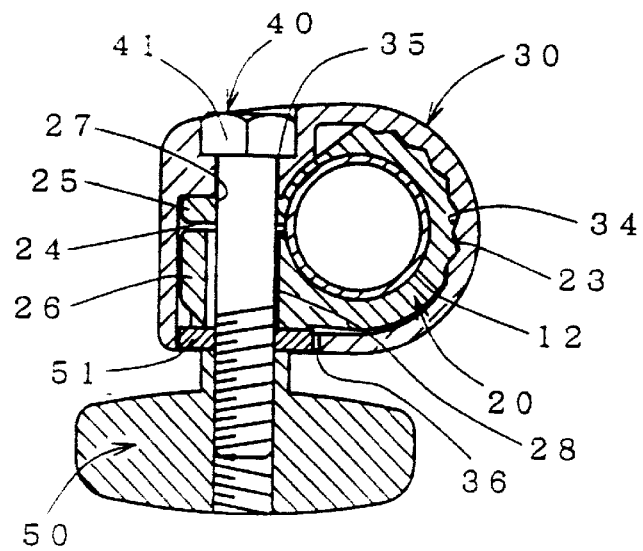
FIG. 3 is a cross section along line 3—3 in FIG. 2.
Figure 4:
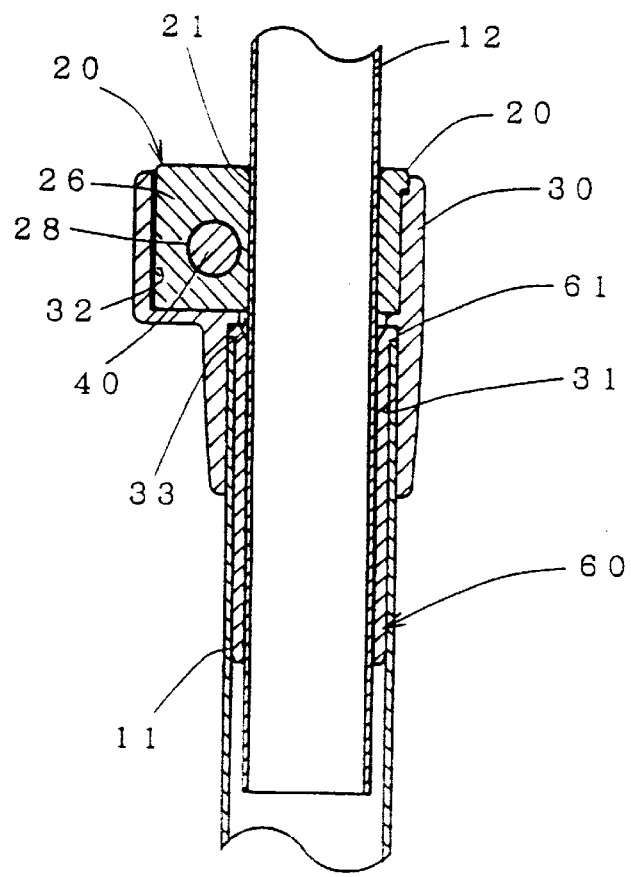
FIG. 4 is a cross section along line 4—4 in FIG. 2.

The tightening bush 20 has a tubular body with a small diameter pipe holding hole 21 that holds the small diameter pipe 12. One circumferential region around the exterior periphery of the bush 20 has formed on it a plurality of raised ribs or splines 23 that extend in the tubular or axial direction (FIGS. 3 and 4). In addition, the bush is completely cut through radially at 24 in the tubular direction defining cut edges 25 and 26 which face each other and sandwich the cut 24. The cut 24 extends into the small diameter pipe holding hole 21, and the cut is formed generally at the opposite circumferential region from the ribs on the bush 20. The edges 25, 26 have respective bolt holes 27 and 28 formed in them and the holes are aligned for receiving the bolt 40.

The main holding body 30 has a large diameter pipe holder tube 31 below it that is shaped to encase and hold the outer periphery of the upper end of the large diameter pipe 11 and has a tightening bush accommodating part 32 above the tube 31. The part 32 defines a receptacle 33 (see FIG. 4) that accommodates that tightening bush 20 received from above. The receptacle 33 extends down to the small diameter pipe 12 that is held in the small diameter pipe holding hole 21 of the tightening bush 20.

At a circumferential region that corresponds to that of the ribs 23 of the tightening bush 20, the inner peripheral surface of the bush accommodating part 32 has a complementary raised gear or spline surface 34 that meshes with the ribs 23. This fixes the rotation position of the bush 20 in the receptacle 33.

At a position corresponding to and overlapping the bolt run-through holes 27 and 28 of the tightening bush 20, a bolt seat 35 and a bolt run-through opening 36 are formed in the part 32.

The tightening bolt 40 is inserted through the bolt seat 35 of the main holding body. It extends to the bolt run-through part 36 of the main holding body 30 after passing through the bolt run-through holes 27 and 28 of the tightening bush 20. The head 41 of the tightening bolt 40 is held in the bolt seat 35 of the main holding body 30, in FIG. 3, which facilitates the tightening and improves the outside appearance.

The tightening nut 50 is screwed onto the tightening bolt 40. This compresses the cut edge 26 of the tightening bush 20 for tightening against the small diameter pipe 12 in the small diameter pipe holding part 2 1. This also moves the raised ribs 23 on the outer periphery of the small diameter pipe holding hole 21 of the tightening bush 20, in the direction of arrow a in FIG. 5, which presses the ribs 23 to the ribs 34 of the main holding body 30. A washer 51 distributes the pressure of the tightening nut 50 against the tightening bush 20 over a wide area.

In FIG. 1, an auxiliary bush 60 may be inserted into the inner periphery of the large diameter pipe 11 at its upper end. When the small diameter pipe 12 is inserted into the auxiliary bush 60, the radial gap between the large diameter pipe 11 and the small diameter pipe 12 is eliminated. Where a musical performance involves fiercely beating a cymbal or a tom-tom drum provided at the top of a cymbal stand, as shown in this example, moreover, it is desirable that the auxiliary bush 60 be made of a resin, which provides a buffering effect to eliminate extraneous sounds such as the sound created by the contact of the pipes.

To assemble the pipe holding device 10, the main holding body 30 is installed on the large diameter pipe 11. The small diameter pipe 12 is installed in the tightening bush 20, which is inserted into the bush accommodating part 32 of the main holding body 30. The nut 50 is tightened, securing the small diameter pipe 12 in the part 32. The small diameter pipe 12 is inserted into the large diameter pipe 11 through the auxiliary bush 60.

Figure 5:
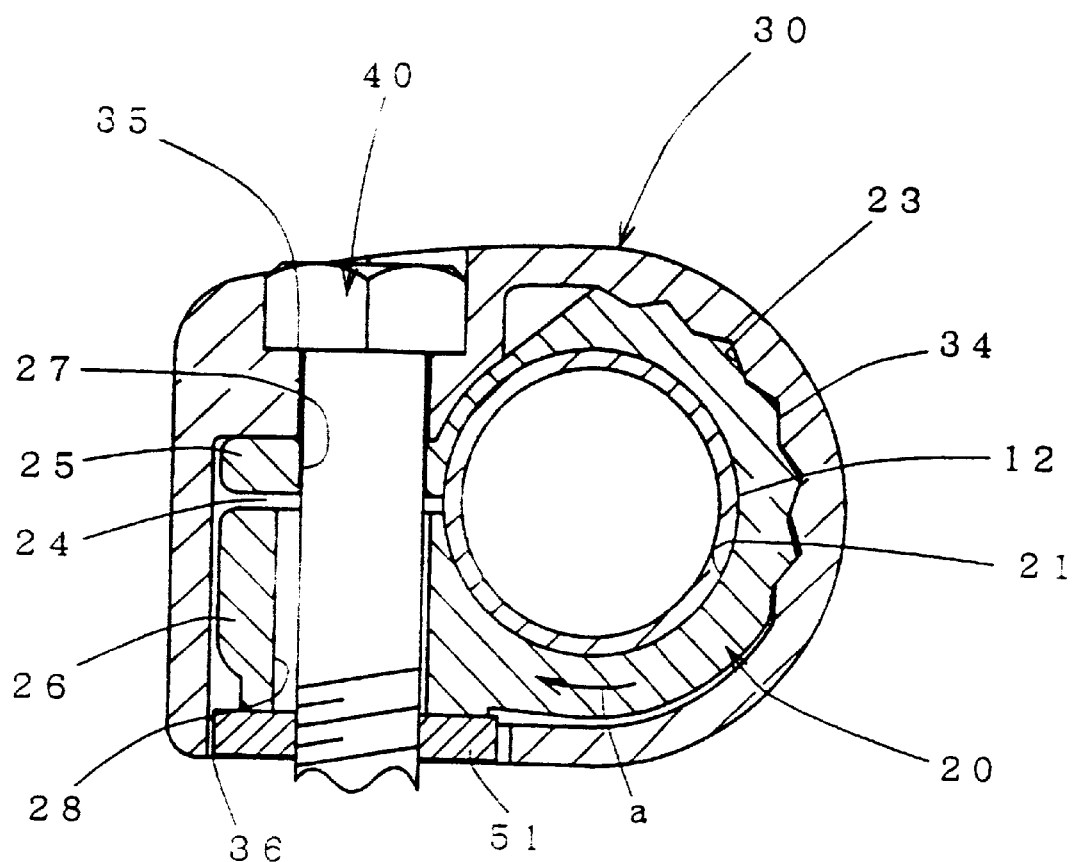
FIG. 5 is an expanded cross section of the essential part.

As the tightening nut 50 is tightened and the cut edge 26 is compressed, the tightening bush 20 compresses the small diameter pipe 12, while also moving the outer periphery of the small diameter pipe 12 in the circumferential direction a in FIG. 5. This presses the ribs 23 on the outer periphery of the tightening bush 20 to the raised ribs 34 of the main holding body 30. When the ribs 23 and the gear surface 34 are pressed together in this manner, the tightening bush 20 is firmly held to the main holding body 30, thereby effecting a firm connection.

As the tightening bush 20 runs through and is held inside the main holding body 30 by the tightening bolt 40, a spring pin for preventing possible drop-out becomes unnecessary.

In the pipe holding device of this invention, the tightening bolt and the tightening nut are separate members and the screw region of the tightening bolt is not exposed. This makes it possible to avoid accidents in which the tightening bolt is bent or damaged during movement of the stand, as such damage may make it impossible to tighten the nut completely. Further, this simultaneously improves the outside appearance of the stand.

Moreover, the pressing of the raised ribs on the tightening against the raised ribs on the inner periphery of the main holding body receptacle firmly connects the large diameter pipe and the small diameter pipe.

The invention provides a pipe connector that offers high strength and durability of the tightened part, effects a firm connection between a small diameter pipe and a large diameter pipe, and has an improved outside appearance. Moreover, when the small diameter pipe is inserted into and held inside the large diameter pipe through an auxiliary bush, this makes it possible to firmly connect the pipes without shakiness, thereby also preventing extraneous noise at a performance.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A pipe connector for connecting a large diameter pipe to a small diameter pipe, the pipe connector comprising:

a tightening bush which is generally tubular in shape having a peripheral exterior, an axis, and a small pipe holding hole extending through the bush along the axis;

a set of first ribs extending in the axial direction on a first circumferential region of the peripheral exterior of the bush;

the bush being cut through from the peripheral exterior to the small pipe holding hole at a second circumferential region away from the first region and the bush being shaped to define cut edges at the sides of the cut, the cut edges having bolt run-through holes aligned so that a bolt may be passed through them;

a main holding body including a large pipe holding part shaped to hold the outer circumference of the large diameter pipe at one axial side of the holding body;

a tightening bush accommodating part with a receptacle therein at another axial side of the main holding body, the receptacle being shaped for accommodating the tightening bush; the tightening bush accommodating part having an inner periphery with a second set of axially extending ribs thereon shaped complementary to the ribs on the peripheral exterior of the bush with the ribs being engageable;

a bolt seat and a bolt run-through part at the tightening bush accommodating part of the main holding body and also aligned with the bolt run-through holes of the tightening bush; a bolt that extends through the bolt run-through part of the holding body, the bolt run-through holes of the tightening bush and the bolt seat of the main body;

a tightening nut tightened on the bolt for engaging and compressing one of the edges of the cut in the bush for compressing the cut in the bush, thereby tightening the bush to the small diameter pipe and further moving the first ribs on the periphery of the tightening bush in the circumferential direction and the first ribs being engaged with and prevented from rotation by engaging the second ribs in the inner periphery of the main holding body.

2. The pipe connector of claim 1, further comprising an auxiliary bush in the interior of the large pipe holding part and the auxiliary bush receiving the small diameter pipe within it at the end of the large diameter pipe at the main holding body, and the auxiliary bush fills the radial space between the large diameter pipe and the small diameter pipe.

3. The pipe holding device of claim 2, wherein the auxiliary bush is comprised of a resin material.

* * * * *